United States Patent
Martin et al.

(10) Patent No.: US 10,540,863 B2
(45) Date of Patent: *Jan. 21, 2020

(54) DELAYED MESSAGE PLAYBACK METHODS AND APPARATUS

(71) Applicant: Martigold Enterprises, LLC, Kihei, Maui, HI (US)

(72) Inventors: George Martin, Maui, HI (US); Yale E. Goldman, Merion, PA (US)

(73) Assignee: Martigold Enterprises, LLC, Kihei, Maui, HI (US)

( * ) Notice: Subject to any disclaimer, the term of this patent is extended or adjusted under 35 U.S.C. 154(b) by 410 days.

This patent is subject to a terminal disclaimer.

(21) Appl. No.: 15/489,606

(22) Filed: Apr. 17, 2017

(65) Prior Publication Data

US 2017/0221320 A1   Aug. 3, 2017

Related U.S. Application Data

(63) Continuation of application No. 15/096,183, filed on Apr. 11, 2016, now Pat. No. 9,626,843, which is a
(Continued)

(51) Int. Cl.
*G06F 16/00* (2019.01)
*G08B 3/10* (2006.01)
(Continued)

(52) U.S. Cl.
CPC ........... *G08B 3/105* (2013.01); *F25D 29/008* (2013.01); *G08B 3/00* (2013.01); *G08B 3/10* (2013.01);
(Continued)

(58) Field of Classification Search
CPC .. G08B 3/00; G08B 3/10; G08B 3/105; G09F 25/00; G09F 2025/005; F25D 29/008; H04M 3/4936; H04M 3/4938
(Continued)

(56) References Cited

U.S. PATENT DOCUMENTS 4,117,461 A   9/1978   Kiebala
4,401,971 A   8/1983   Saito et al.
(Continued)

FOREIGN PATENT DOCUMENTS

EP   0772856 B1   6/1997
JP   4032682 A    2/1992
(Continued)

OTHER PUBLICATIONS

International Application No. PCT/US14/29166, filed Mar. 14, 2014. Search Report dated Aug. 22, 2014. 3 pages.
(Continued)

*Primary Examiner* — Vincent F Boccio
(74) *Attorney, Agent, or Firm* — Santangelo Law Offices, P.C.

(57) ABSTRACT

A system for playback of messages. Context appropriate messages for an environment may be played back. Messages may be user behavior interactive and subject to user behavior initiated message playback conditions. User generated environment events may be automatically analyzed and user behavior interactive messages may be automatically coordinated. An automated themed message playback apparatus may have a self-contained housing within which a stored themed message, an in situ user generated environment event sensor, and an automated themed message playback device are housed. User generated environment events may be automatically sensed in situ.

21 Claims, 3 Drawing Sheets

Related U.S. Application Data continuation of application No. 13/830,259, filed on Mar. 14, 2013, now Pat. No. 9,311,837.

(51) Int. Cl.
| | | |
|---|---|---|
| *G09F 25/00* | (2006.01) | |
| *G08B 3/00* | (2006.01) | |
| *F25D 29/00* | (2006.01) | |
| *G10L 17/22* | (2013.01) | |
| *H04M 3/493* | (2006.01) | |

(52) U.S. Cl.
CPC ........... *G08B 3/1033* (2013.01); *G09F 25/00* (2013.01); *G10L 17/22* (2013.01); *H04M 3/4936* (2013.01); *H04M 3/4938* (2013.01); *F25D 29/00* (2013.01); *F25D 2500/06* (2013.01); *G09F 2025/005* (2013.01)

(58) Field of Classification Search
USPC ........................................................ 707/736
See application file for complete search history.

(56) References Cited

U.S. PATENT DOCUMENTS

| | | | |
|---|---|---|---|
| 4,733,634 | A | 3/1988 | Hooser |
| 4,771,390 | A | 9/1988 | Dolph et al. |
| 4,835,520 | A | 5/1989 | Aiello |
| 4,839,749 | A | 6/1989 | Franklin |
| 5,239,943 | A | 8/1993 | Kim |
| 5,299,529 | A | 4/1994 | Ramirez |
| 5,309,145 | A | 5/1994 | Branch et al. |
| 5,387,108 | A | 2/1995 | Crowell |
| 5,604,483 | A | 2/1997 | Giangardella et al. |
| 5,856,781 | A | 1/1999 | Michel et al. |
| 5,894,275 | A | 4/1999 | Swingle |
| 5,903,869 | A | 5/1999 | Jacobson et al. |
| 6,154,130 | A | 11/2000 | Mondejar et al. |
| 6,347,706 | B1 | 2/2002 | D'Ambrosio |
| 6,542,076 | B1 | 4/2003 | Joao |
| 6,873,255 | B2 | 3/2005 | Gallagher |
| 6,882,280 | B2 | 4/2005 | Ferragut, II |
| 6,947,731 | B1 | 9/2005 | Kamperschroer |
| 6,982,640 | B2 | 1/2006 | Lindsay et al. |
| 7,167,100 | B2 | 1/2007 | Yeh |
| 7,772,986 | B2 | 8/2010 | Olson et al. |
| 7,925,976 | B2 | 4/2011 | Shin et al. |
| 8,047,988 | B2 | 11/2011 | Lee et al. |
| 9,311,837 | B2 | 4/2016 | Martin |
| 9,626,843 | B2 | 4/2017 | Martin |
| 2003/0010043 | A1 | 1/2003 | Ferragut |
| 2004/0100380 | A1 | 5/2004 | Lindsay et al. |
| 2006/0055553 | A1 | 3/2006 | Yeh |
| 2006/0089540 | A1 | 4/2006 | Meissner |
| 2006/0256132 | A1 | 11/2006 | Shin et al. |
| 2007/0236346 | A1 | 10/2007 | Helal et al. |
| 2008/0195944 | A1 | 8/2008 | Lee et al. |
| 2010/0121789 | A1 | 5/2010 | Bednyak et al. |
| 2011/0218809 | A1 | 9/2011 | Suzuki et al. |
| 2012/0078623 | A1 | 3/2012 | Vertegaal et al. |
| 2013/0009761 | A1 | 1/2013 | Horseman |
| 2013/0013545 | A1 | 1/2013 | Agarwal |
| 2013/0042638 | A1 | 2/2013 | Eom et al. |
| 2013/0044912 | A1 | 2/2013 | Kulkarni et al. |

FOREIGN PATENT DOCUMENTS

| | | |
|---|---|---|
| JP | 8159646 A | 6/1996 |
| JP | 2002303482 | 10/2002 |
| JP | 2003214744 | 7/2003 |
| WO | 0046797 | 8/2000 |
| WO | 2006083866 A2 | 8/2006 |
| WO | 2014153120 A1 | 2/2014 |

OTHER PUBLICATIONS

International Application No. PCT/US14/29166, filed Mar. 14, 2014. Written Opinion dated Aug. 22, 2014. 13 pages.
U.S. Appl. No. 13/830,259, filed Mar. 14, 2013. First Named Inventor: Martin.
U.S. Appl. No. 15/096,183, filed Apr. 11, 2016. First Named Inventor: Martin.
"Light Activated Sound Modules / Chips" Sound Expression GreetingsTM. http://soundexpressiongreetings.com/musical-greetings/light-activated-sound-modules.htm. Mar. 24, 2015.

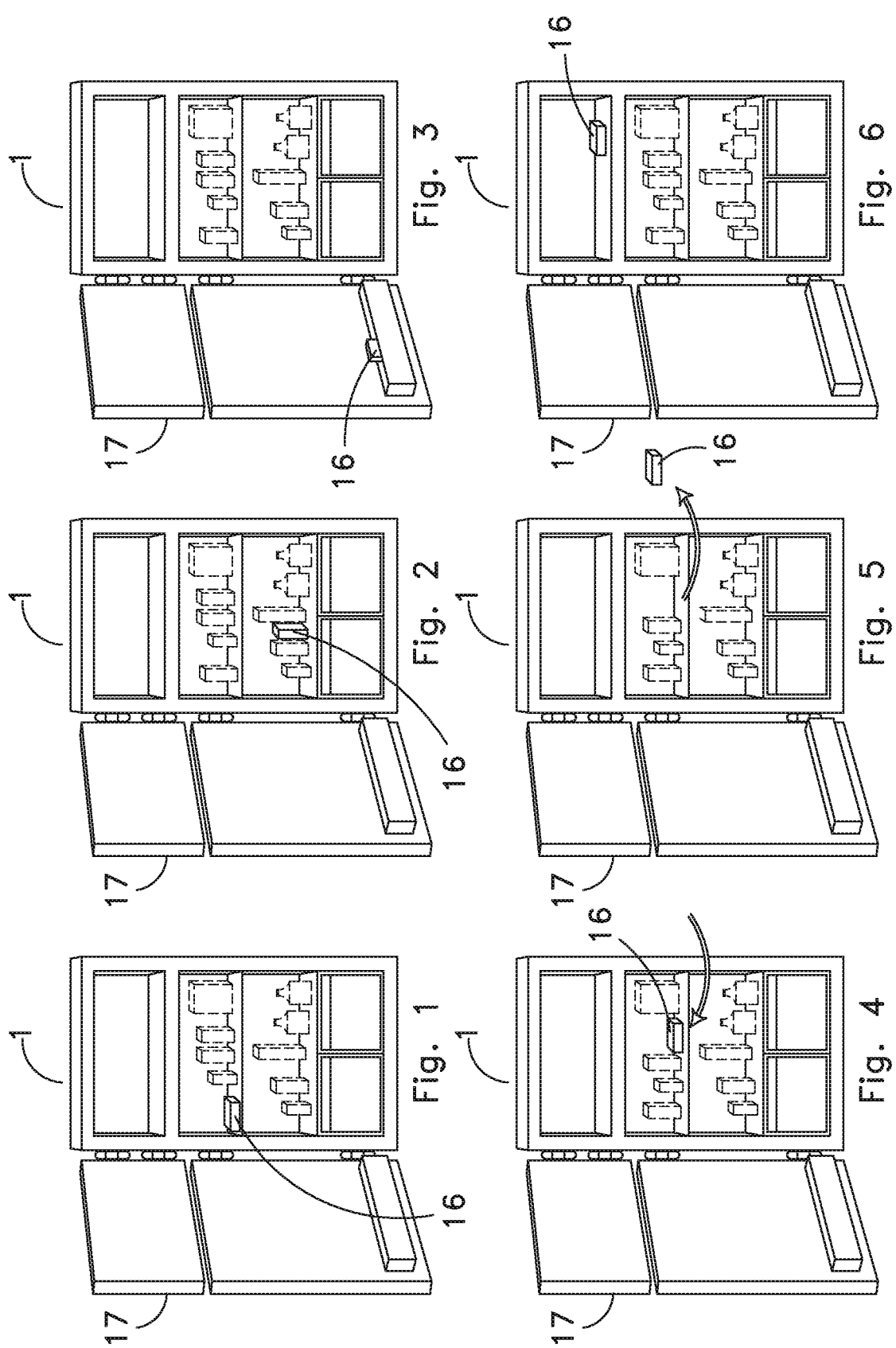

DELAYED MESSAGE PLAYBACK METHODS AND APPARATUS

This is a US Continuation Application, which claims priority to, and the benefit of, U.S. Continuation application Ser. No. 15/096,183, filed Apr. 11, 2016 and issuing as U.S. Pat. No. 9,626,843 on Apr. 18, 2017; which is a Continuation Application of U.S. Nonprovisional application Ser. No. 13/830,259, filed Mar. 14, 2013, and issued as U.S. Pat. No. 9,311,837 on Apr. 12, 2016, the entirety of all applications are hereby incorporated by reference in their entirety.

BACKGROUND

The present inventive technology relates to the field of message playback devices. The present inventive technology may be used more particularly, but not exclusively, to play back context appropriate messages relevant to an environment in which a user interacts.

While widely available in general, conventional message playback devices may lack certain capabilities that would be desirable in such devices. For example, conventional message playback devices may have limited capabilities to coordinate message playback to specific environments, address specific user needs, and interact with such users in a contextually aware manner relevant to the specific environment in which the message playback device is placed. Moreover, conventional message playback devices may lack self-contained configurations and in situ capabilities to leverage their usefulness with respect to the specific nature of environments in which they may be placed. Such environments may include, but are not limited to, refrigerators, automobiles, and other locations in which message playback capabilities appropriate to the specific environment may be desired.

The foregoing problems related to conventional message playback devices may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTIVE TECHNOLOGY

In one embodiment, the inventive technology may utilize a method for automatically playing back context appropriate messages for an environment comprising the steps of storing at least one user behavior interactive message, storing at least one user behavior initiated message playback condition, automatically sensing at least one user generated environment event, automatically analyzing said at least one user generated environment event with respect to said at least one user behavior initiated message playback condition, automatically coordinating at least one said user behavior interactive message to said at least one user behavior initiated message playback condition based on said automated analysis, and automatically playing back at least one said user behavior interactive message based on said automated coordination.

In another embodiment, the inventive technology may utilize an automated context appropriate message playback apparatus for an environment comprising at least one stored user behavior interactive message, at least one stored user behavior initiated message playback setting, at least one user generated environment event sensor, an automated user generated environment event analysis processor responsive to said at least one user generated environment event sensor and said at least one stored user behavior initiated message playback setting, an automated user behavior interactive message coordination processor responsive to said automated user generated environment event analysis processor and said at least one stored user behavior interactive message, and an automated user behavior interactive message playback device responsive to said automated user behavior interactive message coordination processor.

In another embodiment, the inventive technology may utilize a method for automatically playing back refrigerator themed messages comprising the steps of storing at least one refrigerator themed message on an automated self-contained refrigerator themed message playback device, placing said automated self-contained refrigerator themed message playback device inside a refrigerator, allowing said automated self-contained refrigerator themed message playback device to remain inside said refrigerator for a period of time, user generating a refrigerator environment event, automatically in situ sensing said user generated refrigerator environment event with said automated self-contained refrigerator themed message playback device, and automatically playing back a refrigerator themed message with said automated self-contained refrigerator themed message playback device.

In another embodiment, the inventive technology may utilize an automated refrigerator themed message playback apparatus comprising at least one stored refrigerator themed message, at least one automated in situ user generated refrigerator environment event sensor, an automated refrigerator themed message playback device responsive to said at least one in situ user generated refrigerator environment event sensor and said at least one stored refrigerator themed message, a self-contained housing within which said stored refrigerator themed message, said in situ user generated refrigerator environment event sensor, and said automated refrigerator themed message playback device are housed, and a refrigerator interior placement configuration of said self-contained housing.

Naturally, further objects of the inventive technology will become apparent from the description and drawings below.

BRIEF DESCRIPTION OF THE DRAWINGS

FIG. 1 is a conceptual representation of a message playback device situated in a refrigerator environment in a first configuration in one exemplary embodiment.

FIG. 2 is a conceptual representation of a message playback device situated in a refrigerator environment in a second configuration in one exemplary embodiment.

FIG. 3 is a conceptual representation of a message playback device situated in a refrigerator environment in a third configuration in one exemplary embodiment.

FIG. 4 is a conceptual representation of a message playback device situated in a refrigerator environment in a fourth configuration in one exemplary embodiment.

FIG. 5 is a conceptual representation of a message playback device situated in a refrigerator environment in a fifth configuration in one exemplary embodiment.

FIG. 6 is a conceptual representation of a message playback device situated in a refrigerator environment in a sixth configuration in one exemplary embodiment.

DETAILED DESCRIPTION OF THE PREFERRED EMBODIMENTS

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Various embodiments of the inventive technology may involve automatically performing certain actions, have certain automated parts or components, or generally may be effected in an automated or automatic manner. It should be understood throughout that such autonomy may involve the substantial lack of a need for direct human intervention or oversight for the relevant subject matter, and that such autonomy may be effected in any suitable manner consistent with the inventive principles described herein, such as by hardware, software, or the like.

Figure 7:
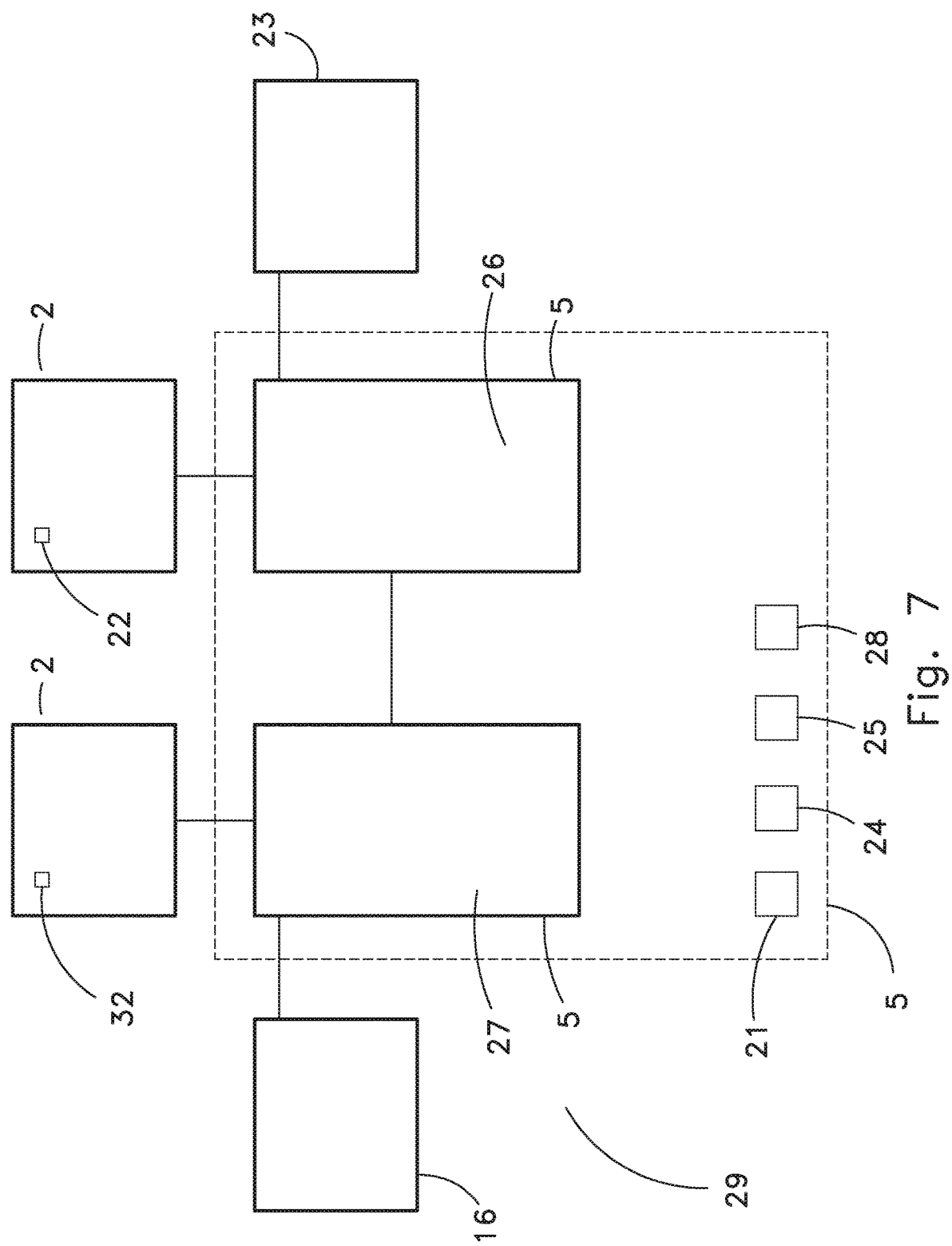
FIG. 7 is a schematic representation of a message playback device having an automated user generated environment event analysis processor and an automated user behavior interactive message coordination processor in one exemplary embodiment.
Figure 8:
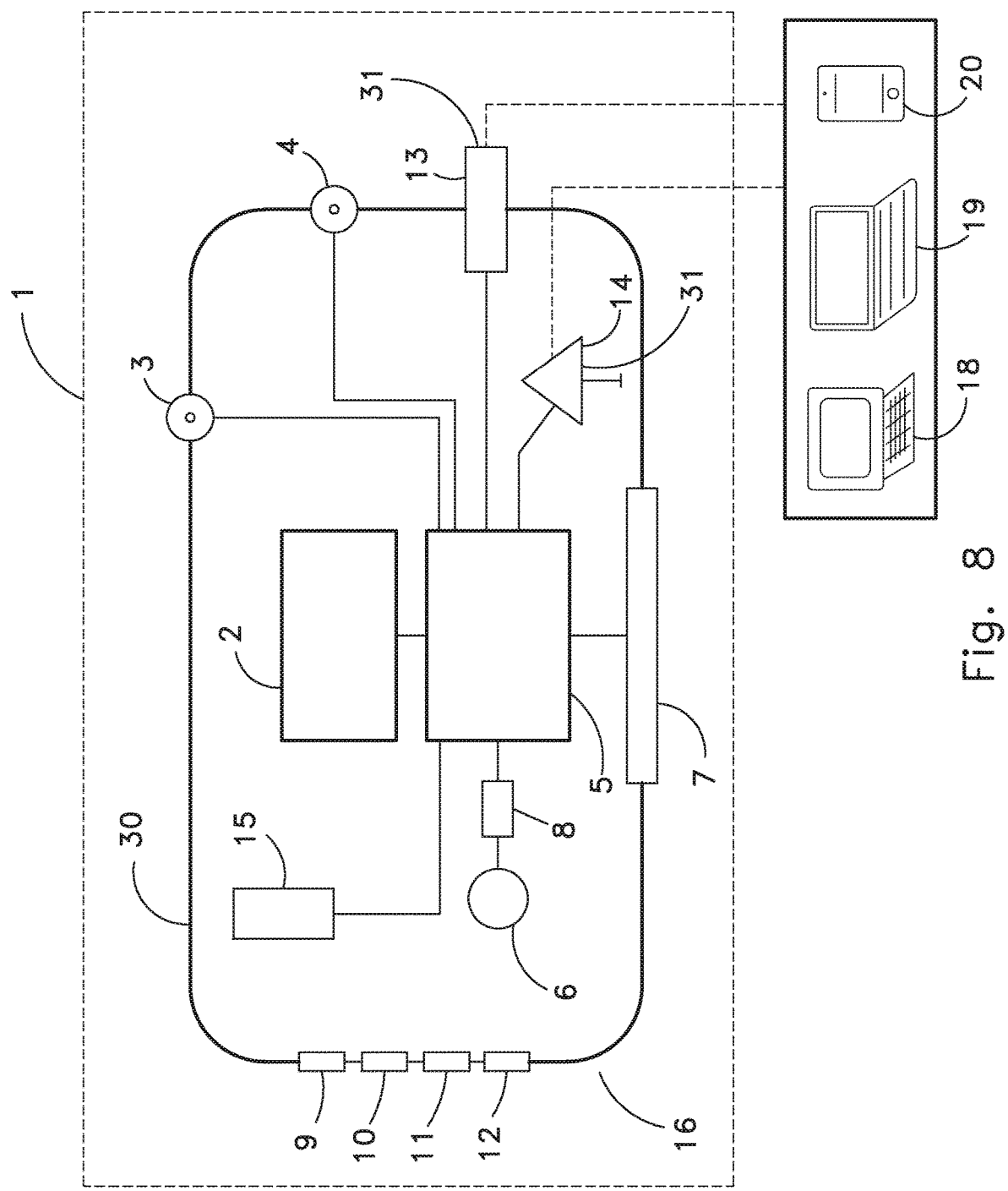
FIG. 8 is a schematic representation of a message playback device having a self-contained housing and in situ situated in an environment in one exemplary embodiment.

Now with reference primarily to FIGS. 7 and 8, embodiments of the inventive technology may involve a method for playing back context appropriate messages for an environment (1) and an automated context appropriate message playback apparatus for an environment (1). An environment (1) may be any environment in which a message playback apparatus may be placed, such as a refrigerator, an automobile, or the like. It may be appreciated that an environment may have certain specific characteristics relevant to a user, such as a refrigerator being a place where a user may go for food, an automobile being place where an individual is away from his home or other locations, etc.

The method may involve storing at least one user behavior interactive message (32). A message may be interactive with user behavior, for example, where the message contains information relevant to the user's behavior, perhaps while the user is engaging in such behavior. For example, with respect to a refrigerator, a message may be interactive by providing diet information when a user opens the refrigerator. Similarly, with respect to an automobile, a message may be interactive by providing a reminder to check if the front door is locked upon the user starting the automobile. Naturally, these examples are merely illustrative and should not be construed to limit the scope of what may constitute user behavior interactive message (32).

A user behavior interactive message (32) may be stored in any suitable manner consistent with the inventive principles discussed herein, including but not limited to storing a user recorded message, storing a pre-recorded message, storing a user selected message (as from a list or menu of messages made available to the user), storing a downloaded message, storing a memo message, storing a message subject to a timer, storing a message subject to random playback, storing a programmed message (as where a user may program a message into a computing device), storing a smartphone programmed message, storing a computer programmed message, remotely storing a message (as where a user may store a message at a user location remote from a message playback device location) and the like.

Remotely storing a message in various embodiments may involve storing a message from a location remote from the storage medium, as for example wherein a user may remotely store the message onto a playback device at a location remote from the playback device. The manner of storing and the types of messages stored may be any as described herein that otherwise may be consistent with the principles of storing from a remote location. For example, remotely storing may be done online, via a computer, via a smartphone, wirelessly, and the like. Similarly, remotely storing may involve programming a message, downloading a message, recording a message, and the like. Moreover, any suitable hardware or software may be utilized to effect remotely storing a message consistent with the inventive principles described herein. Accordingly, various embodiments may include a remote message storage interface, a remote message storage medium, a remote message storage memory, and the like.

It also may be noted that a user behavior interactive message (32) may have relevancy derived from the environment in which the message is played back, such as diet information in a refrigerator environment, reminder information in an automobile environment, and the like. These may be examples of storing a message having content related to user behavior that is interactive the environment. Such content may be themed content, such as refrigerator themed content, automobile themed content, and the like. Again, these examples are merely illustrative and should not be construed to limit the scope what may constitute storing a message having content related to user behavior that is interactive the environment.

The method may involve storing at least one user behavior initiated message (32) playback condition. Upon satisfaction of the stored condition, a message having certain content may be played back. For example, a stored condition might be the opening of a refrigerator door, and upon satisfaction of this condition, i.e. the opening of the refrigerator door, a message having refrigerator themed content might be played back. Similarly, a stored condition might be the starting of an automobile, and upon satisfaction of this condition, i.e., the starting of the automobile, a message having reminder themed content might be played back. Of course, these examples are merely illustrative and should not be construed to limit the scope what may constitute storing at least one user behavior initiated message playback condition. The examples provided here may involve conditions generally taking an "if-then" form, but of course any suitable condition structure may be utilized. More generally, it may be seen that the condition may be behavior initiated by a user, such as opening a refrigerator door or starting an automobile, and that storing a user behavior initiated message playback condition may involve relating message content to an environment factor of the environment, such as the opening of a refrigerator door, the starting of an automobile, or the like.

Accordingly, the apparatus in various embodiments may have at least one stored user behavior initiated message playback setting (22), wherein the setting may embody the condition in all its characteristics and properties as described herein.

It may in fact be appreciated that any suitable environment factor may be related to message content. Factors may include the time of day, the number of times a refrigerator door had been opened, the simple occurrence or number of times a refrigerator light has activated, and the like. Similarly, it may appreciated that relating message content to an environmental factor may draw on any message content relevant to the environment, such as relating refrigerator themed content, relating humor, relating a user goal (as in a diet goal in a refrigerator environment), relating a reminder (as in reminding a user to check if the front door is locked in an automobile environment), relating inspirational message content, relating motivational message content, and so forth.

Moreover, embodiments may involve combining environmental factors, message content, and user behavior initiated message playback conditions in sophisticated and multi-layered ways. For example, in a refrigerator environment, multiple environmental factors may include a count of the number of times the refrigerator door has been opened and the time period in which such door openings have occurred, such that upon the user behavior message playback condition of opening the refrigerator door, a very targeted message content can be delivered to the user, e.g., "You have opened the refrigerator door six times since breakfast, remember your diet, tubby!" Again, these examples are merely illustrative and should not be construed to limit the scope of combining environmental factors, message content, and user behavior initiated message playback conditions. Rather, it may be appreciated that the ways in which environmental factors, message content, and user behavior initiated message playback conditions may be utilized with one another provide very high flexibility in playing back context appropriate message for an environment in which a user interacts.

In line with the foregoing, it follows that a stored user behavior initiated message playback setting (22) in various embodiments may be an environmental factor relational message content setting.

As may follow from the foregoing principles related to user behavior, the method may involve automatically sensing at least one user generated environment event. These may be events in the environment generated by the user, such as opening a refrigerator door, starting an automobile, or the like. Sensing may be accomplished in any suitable automated manner consistent with the inventive principles discussed herein, including but not limited to sensing light, sensing motion, sensing vibration, sensing acceleration, sensing sound, sensing temperature, sensing an electronic signal, sensing a magnetic change, and the like. For example, embodiments may involve sensing a refrigerator light activating, sensing a refrigerator door opening, sensing the number of times a refrigerator door has opened, sensing the motion of an item in a refrigerator, and the like.

Accordingly, the apparatus in various embodiments may include at least one user generated environment event sensor (23), which may include a light sensor, a motion sensor, a vibration sensor, an acceleration sensor, a sound sensor, a temperature sensor, an electronic sensor, a magnetic sensor, a refrigerator light sensor, a refrigerator door sensor, a refrigerator door count sensor, a refrigerator item movement sensor, and the like.

Embodiments also may involve logging an automatically sensed user generated environment event, such as to generate a log of data that may be useful to a user. Logged events may be any as appropriate from those sensed, and may include but not be limited to the time of day, the number of times a refrigerator door has been opened, the number times a refrigerator light has been activated, and the like. Such logged events may be provided to user, for example so that a user may track refrigerator activity in connection with diet needs or the like. The apparatus in various embodiments accordingly may have at least one automatically sensed user generated environment event log (24), such as a time of day log, a refrigerator door count log, a refrigerator light activation log, and the like, and also may have an automatically sensed user generated environment event log user output (25).

The method may involve automatically analyzing at least one user generated environment event with respect to at least one user behavior initiated message playback condition, and automatically coordinating at least one user behavior interactive message (32) to at least one user behavior initiated message playback condition based on the automated analysis.

Such automated analysis and coordination may be effected by any suitable means consistent with the inventive principles discussed herein, including but not limited to using hardware, using at least one integrated circuit, using a microprocessor, using software, and using one or more software routines or subroutines. The automated nature of the analysis and coordination may be apparent from the substantial lack of a need for direct human intervention or oversight. Accordingly, certain embodiments of the apparatus may have an automated user generated environment event analysis processor (26) responsive to a user generated environment event sensor (23) and a stored user behavior initiated message playback setting (22), and an automated user behavior interactive message coordination processor (27) responsive to an automated user generated environment event analysis processor (26) and a stored user behavior interactive message (32).

Moreover, analyzing may involve any appropriate analysis consistent with the inventive principles described herein suitable to determine an appropriate relationship between the user generated environment event and the user behavior initiated message playback condition relevant to the playback of a user behavior interactive message (32). For example, where the event may be the opening of a refrigerator door, and the condition may be playing back a refrigerator themed message upon the opening of the refrigerator door, the analysis may determine that a refrigerator themed message should be played. Similarly, where the event may be the starting of an automobile, and the condition may be playing back a reminder message upon the starting of an automobile, the analysis may determine that a reminder message should be played.

Similarly, coordinating may involve any appropriate coordination consistent with the inventive principles discussed herein suitable to identify a user behavior interactive message (32) relevant to the user behavior initiated message playback condition used in the earlier analysis. For example, where the analysis determined that a refrigerator themed message should be played, coordinating may involve identifying a specific stored refrigerator themed message that should be played back. Where multiple refrigerator themed messages are stored, coordination may involve identifying the most appropriate message, such as coordinating a message itemizing the first opening of a refrigerator door to the event of the first time the door is opened, coordinating a message itemizing the second opening of a refrigerator door to the event of the second time the refrigerator door is opened, and the like.

Of course, these examples are merely illustrative and should not be construed to limit the scope of automatically analyzing and automatically coordinating consistent with the inventive principles discussed herein.

Accordingly, the apparatus in various embodiments may have an automated user generated environment event analysis processor (26) and an automated user behavior interactive message coordination processor (27) which may be responsive to a refrigerator light activation, responsive to a refrigerator light activation count, responsive to a refrigerator door, responsive to a refrigerator door opening count, responsive to refrigerator item motion, and the like.

In some embodiments, automatically analyzing and automatically coordinating may involve accounting for dynamically changing circumstances in an environment during a reference period, such as wherein a refrigerator door may be opened multiple times during the reference period, an automobile may be started multiple times during the reference period, or any other user relevant changes may occur in the environment during the reference period. Any suitable reference period may be defined consistent with the inventive principles described herein, such as a user-defined time period, a timer countdown time period, or a time of day period.

For example, a reference period may be a time of day, such as morning, afternoon, evening, night, breakfast time, lunch time, dinner time, snack time, or the like, and dynamically changing circumstances may include the number of times a refrigerator light activates, the number of times a refrigerator door opens, the motion of items in the refrigerator (such as they may be moved around by a user), and the like. Accounting for these dynamically changing circumstances, through the steps of automatically analyzing and automatically coordinating, may include varying message playback and varying message content, such as perhaps by referencing the time of day (e.g., "You just had breakfast!"), perhaps playing back progressively more aggressive message content (e.g., "Remember your diet" followed by "Don't eat that" followed by "Step on a scale, tubby!"), perhaps by itemizing user generated environment events (e.g., "This is the sixth time you've opened the refrigerator door in the last hour"), or the like.

Again, these examples are merely illustrative and should not be construed to limit the scope of accounting for dynamically changing circumstances in an environment during a reference period consistent with the inventive principles discussed herein.

Moreover, the automated user generated environment event analysis processor (26) and automated user behavior interactive message coordination processor (27) in the apparatus in various embodiments may be reference period dynamically environmentally responsive processors. The reference period may be effected by any suitable hardware or software, and various embodiments may be a reference period program (28), such as a time of day program, a morning program, an afternoon program, an evening program, a night program, a breakfast program, a lunch program, a dinner program, a snack program, or the like. The processors also may be variable message playback processors, such as progressively aggressive message content playback processors, user generated environment event itemization processors, and the like.

The method may involve automatically playing back at least one user behavior interactive message (32) based on an automated coordination. Playback may be effected in any suitable manner consistent with the inventive principles discussed herein. In particular, playback should be understood as not being limited simply to sounds, but rather any form by which a message may be communicated to a user. Accordingly, playback may include but not me limited to to using audio communication, using a speaker, using text to speech, using a text to speech chip, using visual communication, using a display, using a visual display, using an LCD display, using a lamp, using tactile communication, using a tactile display, using vibration, using a decorative element, or the like. With respect to a decorative element, decoration may not be limited simply to a decoration of the apparatus, but may be functionally useful for the playback, such as wherein a display may be decorative to appeal to or capture the attention of a user, for example a clown's face or a cartoon character to appeal to children. Accordingly, the apparatus in various embodiments may have an automated user behavior interactive message playback device (29) responsive to an automated user behavior interactive message coordination processor (27), and which may embody the properties and characteristics of playing back messages as described herein.

Moreover, automatically playing back may involve interactively addressing a user need prompted by the behavior of the user related to an environment. For example, the method may create the ability to present a user with a relevant message just at the moment the message is most needed, such as just at the moment when a user interaction with an environment creates a circumstance where the user would most benefit from receiving the message. Examples may include the moment at which a user may be getting food from a refrigerator and may need a timely diet reminder, a user may be starting an automobile and may need a timely reminder to make sure the front door is locked, and the like. Accordingly, an automated user behavior interactive message playback device (29) of the apparatus in various embodiments may be a user behavior prompted environment relational need interaction device, such as a diet need interaction device, reminder need interaction device, or the like.

Following from the principles discussed herein, the method in various embodiments may be applicable to a variety of environments. Storing at least one user behavior interactive message may involve storing a user relevant environment themed message, as wherein a message may have refrigerator themed content relevant to user interacting with a refrigerator, reminder themed content relevant to a user interacting with an automobile, or generally any environmentally themed content relevant to the a user interacting with an environment. Storing at least one user behavior initiated message playback condition may involve conditioning message playback to a change in the environment, as wherein message playback may be conditioned to opening a refrigerator door, starting an automobile, or generally any appropriate change in the environment. Automatically sensing at least one user generated environment event may involve sensing a change in the environment, as wherein the opening of a refrigerator door may be sensed, the starting of an automobile may be sensed, or generally any appropriate change in the environment prompted by a user may be sensed. Automatically analyzing the at least one user generated environment event with respect to the at least one user behavior initiated message playback condition may involve evaluating the change in the environment against the conditioning message playback to a change in the environment, as in evaluating the event of the opening of a refrigerator door against the condition of playing back a refrigerator themed message upon the opening of a refrigerator door, evaluating the event of the starting of an automobile against the condition of playing back a reminder message upon the starting of an automobile, or generally evaluating the occurrence of any environment event against the condition of playing back an environment themed message upon the occurrence of such event. Automatically coordinating a user behavior interactive message to a user behavior initiated message playback condition based on the automated analysis may involve selecting the user relevant environment themed message, as wherein a refrigerator themed message relevant to a user opening a refrigerator door may be selected, a reminder relevant to a user starting an automobile may be selected, or generally any environment themed message relevant to a user interacting with such environment may be selected. Automatically playing back the user behavior interactive message based on the automated coordination may involve playing back the user relevant environment themed message, as wherein a refrigerator themed message may be played back to a user interacting with a refrigerator, a reminder message may be played back to a user interacting with an automobile, or generally any environment themed message may be played back to a user interacting with such environment.

Similarly, the apparatus in various embodiments may be utilized in a variety of environments. A stored user behavior interactive message may be a user relevant environment themed message, a stored user behavior initiated message playback setting may be a stored changed environment message playback setting, a user generated environment event sensor may be a changed environment sensor, an automated user generated environment event analysis processor responsive to a user generated environment event sensor and a stored user behavior initiated message playback setting may be a changed environment evaluation processor responsive to a changed environment sensor and a changed environment message playback setting, an automated user behavior interactive message coordination processor responsive to an automated user generated environment event analysis processor and a stored user behavior interactive message may be a user relevant environment themed message selection processor responsive to a changed environment message playback setting and a changed environment evaluation processor, and an automated user behavior interactive message playback device responsive to an automated user behavior interactive message coordination processor may be an automated user relevant environment themed message playback device responsive to an automated user relevant environment themed message selection processor.

Additionally, the examples of the method with respect to specific types of environments may include the following.

In some embodiments, storing at least one user behavior interactive message may involve storing a user relevant refrigerator themed message, storing at least one user behavior initiated message playback condition may involve conditioning message playback to activation of a refrigerator light, automatically sensing at least one user generated environment event may involve sensing a refrigerator light activating, automatically analyzing a user generated environment event with respect to a user behavior initiated message playback condition may involve evaluating said refrigerator light activating against conditioning message playback to activation of a refrigerator light, automatically coordinating a user behavior interactive message to a user behavior initiated message playback condition based on an automated analysis may involve selecting a user relevant refrigerator themed message, and automatically playing back a user behavior interactive message based on an automated coordination may involve playing back a user relevant refrigerator themed message.

In some embodiments, a stored user behavior interactive message may be a stored user relevant refrigerator themed message, a stored user behavior initiated message playback setting may be a stored refrigerator light activation message playback setting, a user generated environment event sensor may be refrigerator light activation sensor, a user generated environment event analysis processor responsive to a user generated environment event sensor and a user behavior initiated message playback setting may be an automated refrigerator light activation evaluation processor responsive to a refrigerator light activation sensor and a refrigerator light activation message playback setting, an automated user behavior interactive message coordination processor responsive to an automated user generated environment event analysis processor and a stored user behavior interactive message may be an automated user relevant refrigerator themed message selection processor responsive to an automated refrigerator light activation evaluation processor and a stored user relevant refrigerator themed message, and an automated user behavior interactive message playback device responsive to an automated user behavior interactive message coordination processor may be an automated user relevant refrigerator themed message playback device responsive to an automated user relevant refrigerator themed message selection processor.

In some embodiments, storing a user behavior interactive message may involve storing a user relevant refrigerator time of day themed message, storing at least one user behavior initiated message playback condition may involve conditioning message playback to a time of day, sensing a user generated environment event may involve sensing a change in a refrigerator environment at such time of day, automatically analyzing a user generated environment event with respect to a user behavior initiated message playback condition may involve evaluating a change in said refrigerator environment at such time of day against conditioning message playback to a time of day, automatically coordinating a user behavior interactive message to a user behavior initiated message playback condition based on an automated analysis may involve selecting a user relevant refrigerator time of day themed message, and automatically playing back a user behavior interactive message based on an automated coordination may involve playing back a user relevant refrigerator time of day themed message.

In some embodiments, a stored user behavior interactive message may be a stored user relevant refrigerator time of day themed message, a stored user behavior initiated message playback setting may be a time of day message playback setting, a user generated environment event sensor may be a changed refrigerator environment time of day sensor, an automated user generated environment event analysis processor responsive to a user generated environment event sensor and a user behavior initiated message playback setting may be an automated changed refrigerator environment time of day evaluation processor responsive to a changed refrigerator environment time of day sensor and a time of day message playback setting, an automated user behavior interactive message coordination processor responsive to an automated user generated environment event analysis processor and a stored user behavior interactive message may be an automated user relevant refrigerator time of day themed message selection processor responsive to an automated changed refrigerator environment time of day evaluation processor and a stored user relevant refrigerator time of day themed message, and an automated user behavior interactive message playback device responsive to an automated user behavior interactive message coordination processor may be an automated user relevant refrigerator time of day themed message playback device responsive to an automated user relevant refrigerator time of day themed message selection processor.

In some embodiments, storing a user behavior interactive message may involve storing a user relevant refrigerator door opening number themed message, storing a user behavior initiated message playback condition may involve conditioning message playback to the number of times a refrigerator door is opened, automatically sensing a user generated environment event may involve sensing the number of times said refrigerator door is opened, automatically analyzing a user generated environment event with respect to a user behavior initiated message playback condition may involve evaluating the number of times a refrigerator door is opened against conditioning message playback to the number of times a refrigerator door is opened, automatically coordinating a user behavior interactive message to a user behavior initiated message playback condition based on an automated analysis may involve selecting a user relevant refrigerator door opening number themed message, and automatically playing back at least one user behavior interactive message based on an automated coordination may involve playing back a user relevant refrigerator door opening number themed message. Moreover, embodiments may involve relating message content to the number of the times the refrigerator door is opened, playing back progressively more aggressive message content the higher the number of times the refrigerator door is opened, and itemizing the number of the times the refrigerator door is opened.

In some embodiments, a stored user behavior interactive message may be at least one stored user relevant refrigerator door count themed message, a stored user behavior initiated message playback setting may be stored refrigerator door count message playback setting, a user generated environment event sensor may be a refrigerator door count sensor, an automated user generated environment event analysis processor responsive to a user generated environment event sensor and a stored user behavior initiated message playback setting may be an automated refrigerator door count evaluation processor responsive to a refrigerator door count sensor and a refrigerator door count message playback setting, an automated user behavior interactive message coordination processor responsive to an automated user generated environment event analysis processor and a stored user behavior interactive message may be an automated user relevant refrigerator door count themed message selection processor responsive to an automated refrigerator door count evaluation processor and a stored user relevant refrigerator door count themed message, and an automated user behavior interactive message playback device responsive to an automated user behavior interactive message coordination processor may be a user relevant refrigerator door count themed message playback device responsive to an automated user relevant refrigerator door count themed message selection processor. Moreover, embodiments further may have a refrigerator door count variable message playback processor responsive to an automated user relevant refrigerator door count themed message selection processor, such as a progressively aggressive refrigerator door count message content playback processor and a refrigerator door count itemization processor.

In some embodiments, storing a user behavior interactive message may involve storing multiple user behavior interactive messages, storing a user behavior initiated message playback condition may involve storing multiple user behavior initiated message playback conditions, automatically analyzing a user generated environment event with respect to a user behavior initiated message playback condition may involve analyzing a user generated environment event with respect to multiple user behavior initiated message playback conditions, and automatically coordinating a user behavior interactive message to a user behavior initiated message playback condition based on an automated analysis may involve selecting a relevant user behavior interactive message to multiple user behavior initiated message playback conditions based on the automated analysis. Moreover, selecting a relevant user behavior interactive message may involve selecting the most relevant user behavior interactive message from among several such stored messages.

In some embodiments, at least one stored user behavior interactive message may be multiple stored user behavior interactive messages, at least one stored user behavior initiated message playback setting may be multiple stored user behavior initiated message playback settings, an automated user generated environment event analysis processor responsive to a user generated environment event sensor and a stored user behavior initiated message playback setting may be an automated user generated environment event analysis processor responsive to multiple stored user behavior initiated message playback settings, and an automated user behavior interactive message coordination processor responsive to an automated user generated environment event analysis processor and a stored user behavior interactive message may be an automated relevant user behavior interactive message selection processor responsive to multiple stored user behavior interactive messages. Moreover, an automated relevant user behavior interactive message selection processor may be an automated most relevant user behavior interactive message selection processor.

Naturally, these examples are merely illustrative and should not be construed to limit the scope of the environments to which the methods and apparatus may be applicable consistent with the inventive principles discussed herein.

With attention primarily to FIG. 8, any suitable hardware or software may be utilized to implement the method. In one embodiment, storing a message and storing a playback condition may involve storing in electronic memory (2), sensing may involve sensors such as a first photocell (3) and a second photocell (4), automatically analyzing and automatically coordinating may involve using a microprocessor (5), and automatically playing back may involve playing back with both a speaker (6) and a display (7), such as to ensure message communication to users having visual or auditory impairments. The photocells may be differentially oriented, such as left and right, top and side, or the like, perhaps to ensure that if one photocell is blocked, the other may still be capable of sensing. Any suitable microprocessor or microprocessors may be utilized, such an MBED microprocessor or the like. Where a microprocessor may be utilized, such as an MBED microprocessor, embodiments may involve programming a message, such as text programming a text programmable MBED microprocessor and using a text to speech chip (8) responsive to the MBED microprocessor, such as perhaps to permit messages to be user programmed for storage in the electronic memory (2) and playback through the speaker (6) and display (7). Any suitable user controls may be provided, such as including but not limited to an on/off control (9), a speaker volume control (10), a display brightness control (11), a reset control (12), and the like. Any suitable input/output connections also may be provided, such as including but not limited to a USB port (13), a wireless networking device (14), and the like. Power may be supplied with a battery (15), an electrical plug, or the like.

Now with reference primarily to FIGS. 1-6, embodiments of the inventive technology may involve a method for automatically playing back refrigerator themed messages and an automated refrigerator themed message playback apparatus.

The method may involve storing at least one refrigerator themed message on an automated self-contained refrigerator themed message playback device (16) and placing the automated self-contained refrigerator themed message playback device (16) inside a refrigerator (17), and the apparatus may include a self-contained housing (30) within which at least one stored refrigerator themed message, at least one automated in situ user generated refrigerator environment event sensor (23), and an automated refrigerator themed message playback device (16) responsive to the in situ user generated refrigerator environment event sensor (23) and the stored refrigerator themed message are housed.

An automated self-contained refrigerator themed message playback device (16) in various embodiments may include a complete and independent unit all to itself. For example, the device may be a one-piece device, such as wherein its constituent parts may be assembled into one piece, or wherein the device may not require separately locatable pieces to accomplish its functionality. The device in particular may require no separate sensor component, such as sensor components that need connection to a refrigerator light, sensor components that need to be hung from a refrigerator door or perhaps attached to an exterior part of a refrigerator (17), or the like. In various embodiments, the device may be freestanding, such as standing alone in a location in which it is placed, and in embodiments may not require and may not have refrigerator mounting connections. The device in some embodiments also may have a decorative exterior, perhaps as that term has been discussed elsewhere herein.

Accordingly, in various embodiments the self-contained housing (30) of the apparatus may include a one-piece housing, a housing having to separate sensor component, a freestanding housing, a housing having no refrigerator mounting connections, a housing having a decorative exterior, and the like.

The device also may be configured in various embodiments to fit a refrigerator space, such as by shape, size, dimension, rounded corners, or the like. Such refrigerator spaces may include a refrigerator door, a refrigerator shelf, a freezer, and the like. Similarly, various embodiments may involve a refrigerator-proof device, such as wherein the device may be endowed with properties tending to promote its operation in a refrigerator environment. Such properties may include but not be limited to water resistance, cold resistance, humidity resistance, condensation resistance, shock resistance, and the like.

Accordingly, in various embodiments the apparatus may include a refrigerator interior placement configuration of a self-contained housing (30), such as a housing configured to fit a refrigerator space such as a refrigerator door, a refrigerator shelf, a freezer, and the like. Embodiments of the self-contained housing (30) also may include a refrigerator-proof housing, such as a housing having water resistance, cold resistance, humidity resistance, condensation resistance, shock resistance, and the like.

Placing the device inside a refrigerator (17) in various embodiments may involve selectively positioning the device at a desired location inside the refrigerator (17), by which a user may be able to select any suitable location chosen by the user within the refrigerator based on considerations such as available space, out-of-the way location, and the like. Moreover, selectively positioning the device also may permit selectively repositioning the device, as wherein the device may be easily repositioned by the user to any other location within the refrigerator (17). Placing the device similarly may involve selectively orienting the device based on the foregoing considerations, such as by tilting the device, setting the device on its side, propping the device against another item in the refrigerator (17), and the like. Placing the device also may involve quickly one-step placing the device inside the refrigerator and quickly one-step removing the device from the refrigerator, in as much as the device may be self-contained and may have no separate components or refrigerator mountings, and in a manner perhaps analogous to placing or removing any other refrigerator item in normal use.

Accordingly, in various embodiments the self-contained housing (30) of the apparatus may include a refrigerator interior selectively positionable self-contained housing (30), a refrigerator interior selectively repositionable self-contained housing (30), a refrigerator interior selective orientation self-contained housing (30), a quick one-step placement self-contained housing (30), and a quick one-step removal self-contained housing (30).

The method further may involve allowing the automated self-contained refrigerator themed message playback device (16) to remain inside the refrigerator (17) for a period of time, user generating a refrigerator environment event, and automatically in situ sensing the user generated refrigerator environment event with the automated self-contained refrigerator themed message playback device (16). In situ sensing in various embodiments may involve sensing from the placement location of the device inside the refrigerator (17), such as by sensing entirely from inside the refrigerator (17), sensing without utilizing components external to the device, sensing without utilizing components external to the refrigerator (17), and the like. In various embodiments, sensing may involve multi-modal sensing, as wherein different sensing modalities such as light sensors or motion sensor may be used, and multi-directional sensing, as wherein multiple sensors may be oriented in different directions to address the situation where one sensor may be blocked, otherwise unable to sense, or the like.

Accordingly, in various embodiments the in situ user generated refrigerator environment event sensor (23) of the apparatus may include a sensor entirely inside of a refrigerator, a sensor having no refrigerator external components, a multi-modal sensor, a multi-directional sensor, and the like.

Various embodiments may involve adding at least one new refrigerator themed message to an automated self-contained refrigerator themed message playback device (16). This may include adding new messages not present on the device as originally built, adding new messages not present on the device at the time of such adding, or the like.

Naturally, new messages may be added from any suitable source or in any suitable manner consistent with the inventive principles discussed herein. Accordingly, embodiments may include a new refrigerator themed message addition port (31).

In some embodiments, adding a new message may involve downloading at least one new refrigerator themed message from an online source. Connecting online may be done in any suitable manner consistent with the inventive principles discussed herein, and may include but not be limited to directly connecting online, wirelessly connecting online, connecting online via a computer (18), connecting online via a mobile device (19), and connecting online via a smartphone (20). Accordingly, various embodiments may include an online download connection (32) such as a direct online connection, a wireless online connection, a computer online connection, a mobile device online connection, a smartphone online connection, and the like.

Downloading a new refrigerator themed message also may be accomplished in any suitable manner consistent with the inventive principles discussed herein. For example, such downloading in various embodiments may involve engaging in an ecommerce transaction. Embodiments may involve downloading sponsored content, such as wherein the message to be added is sponsored by a third party. Sponsorship may involve various forms of advertising, such as perhaps exposing a user to advertising during or after the downloading procedure, requiring the user to download a new refrigerator themed advertising message (as wherein perhaps advertising may be included before playback of the message, or wherein the message itself may have advertising content in whole or in part), or the like. Various embodiments also may involve utilizing social media in connection with downloading new messages, such as obtaining new messages from social media sources, liking or otherwise recommending message content on social media platforms, and the like. Accordingly, an online download connection (32) in various embodiments may include an ecommerce transaction online download connection, a sponsored content online download connection, a social media utilization online download connection, and the like.

Some embodiments may involve downloading program content. Programs generally may be plans, curriculums, courses, or the like directed toward accomplishing a goal, wherein messages may be part of the program. Examples may include diet programs (wherein messages may reinforce elements of the diet program, such as perhaps reminders of selecting healthy foods from a refrigerator), pharmaceutical programs (wherein messages may reinforce elements of a pharmaceutical treatment program, such as perhaps reminders to take medications stored in a refrigerator at scheduled times), device bundled programs (wherein access to new message availability may be bundled with the purchase of a message playback device), or any program wherein providing targeted, user relevant messages related to an environment may be beneficial. Naturally, the capability to add new messages as described herein may provide substantial added value to a given program. Accordingly, an online download connection (32) in various embodiments may include a program content online download connection for content such as diet program content, pharmaceutical program content, device bundled content, and the like.

Embodiments also may involve automatically updating a message playback device with additional new messages, such as via an online connection. Accordingly, an apparatus in various embodiments may include an automated new message addition updater (21).

While various embodiments described herein have been set forth in terms of refrigerator embodiments, it should be understood and appreciated that the inventive principles underlying such described refrigerator embodiments are general in nature, and that therefore the inventive principles applied to such refrigerator embodiment may be utilized in their general form to applied to any environments, situations, circumstances, or the like otherwise consistent with the inventive principles described herein.

As can be easily understood from the foregoing, the basic concepts of the present inventive technology may be embodied in a variety of ways. It involves both message playback techniques as well as devices to accomplish the appropriate message playback. In this application, the message playback techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "sensor" should be understood to encompass disclosure of the act of "sensing"—whether explicitly discussed or not—and, conversely, were there effectively disclosure of the act of "sensing", such a disclosure should be understood to encompass disclosure of a "sensor" and even a "means for sensing" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The patent application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the message playback devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) the related methods disclosed and described, xxvi) similar, equivalent, and even implicit variations of each of these systems and methods, xxvii) those alternative designs which accomplish each of the functions shown as are disclosed and described, xxviii) those alternative designs and methods which accomplish each of the functions shown as are implicit to accomplish that which is disclosed and described, xxix) each feature, component, and step shown as separate and independent inventions, and xxx) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A method for automatically playing back context appropriate messages for an environment comprising the steps of:
    storing at least one user relevant environment themed behavior interactive message appropriate for a given user generated environment event and subject to a timer, and such storage provided on an automated, battery powered, self-contained selectively positionable and repositionable message playback device within a self-contained housing;
    storing a user environment behavior initiated message playback condition appropriate for said given user generated environment event on said automated, battery powered, self-contained selectively positionable and repositionable message playback device within said self-contained housing;
    commencing a timer countdown time period of said timer;
    automatically in-situ sensing from within said environment by said automated, battery powered, self-contained selectively positionable and repositionable message playback device within said self-contained housing said given user generated environment event;
    automatically analyzing by said automated, battery powered, self-contained selectively positionable and repositionable message playback device within said self-contained housing said given user generated environment event with respect to said user environment behavior initiated message playback condition appropriate for said given user generated environment event;
    automatically analyzing by said automated, battery powered, self-contained selectively positionable and repositionable message playback device within said self-contained housing said timer countdown time period of said timer to make said at least one user relevant environment themed behavior interactive message available in response to said countdown time period;
    playing said at least one user relevant environment themed behavior interactive message appropriate for a given user generated environment event and subject to a timer; and
    automatically individually addressing said user by said automated, battery powered, self-contained selectively positionable and repositionable message playback device within a self-contained housing, by said at least one user relevant environment themed behavior interactive message appropriate for a given user generated environment event and subject to a timer.

2. The method for automatically playing back context appropriate messages for an environment as described in claim 1 wherein said environment comprises an environment selected from the group consisting of an automobile, a refrigerator, a pantry, or other household cabinet.

3. The method for automatically playing back context appropriate messages for an environment as described in claim 1 wherein said environment comprises a refrigerator environment, and wherein said step of automatically analyzing said given user generated environment event comprises the step of analyzing the number of times said refrigerator environment has changed in a given period.

4. The method for automatically playing back context appropriate messages for an environment as described in claim 1 wherein said environment comprises a refrigerator environment, and wherein said step of automatically analyzing said timer countdown time period of said timer comprises the step of analyzing whether said timer countdown time period of said timer has expired.

5. The method for automatically playing back context appropriate messages for an environment as described in claim 1 wherein said environment comprises a refrigerator environment, and wherein said step of storing at least one user relevant environment themed behavior interactive message comprises the steps of storing at least one humor related behavior interactive message, storing at least one user goal related behavior interactive message, and storing at least one reminder related behavior interactive message.

6. The method for automatically playing back context appropriate messages for an environment as described in claim 1 wherein said step of automatically in-situ sensing comprises the step of sensing selected from the group consisting of sensing light, sensing motion, sensing vibration, sensing acceleration, sensing sound, sensing temperature, sensing an electronic signal, and sensing a magnetic change.

7. The method for automatically playing back context appropriate messages for an environment as described in claim 1 wherein said step of automatically in-situ sensing comprises the steps of sensing refrigerator light activation, and sensing the number of times a refrigerator door has opened.

8. The method for automatically playing back context appropriate messages for an environment as described in claim 1 wherein said steps of automatically analyzing comprise the step of accounting for dynamically changing circumstances in said environment during a reference period.

9. The method for automatically playing back context appropriate messages for an environment as described in claim 8 wherein said environment comprises a refrigerator environment, and wherein said reference period comprises a time of day.

10. The method for automatically playing back context appropriate messages for an environment as described in claim 9 wherein said time of day comprises a time of day selected from the group consisting of morning, afternoon, evening, night, breakfast time, lunch time, dinner time, and snack time.

11. The method for automatically playing back context appropriate messages for an environment as described in claim 8 wherein said environment comprises a refrigerator environment, and wherein said reference period comprises said timer countdown time period of said timer.

12. The method for automatically playing back context appropriate messages for an environment as described in claim 8 wherein said environment comprises a refrigerator environment, and wherein said step of accounting for dynamically changing circumstances comprises the step of accounting for the number of times a refrigerator door is opened.

13. The method for automatically playing back context appropriate messages for an environment as described in claim 8 wherein said environment comprises a refrigerator environment, and wherein said step of accounting for dynamically changing circumstances comprises the step of accounting for said timer countdown time period of said timer.

14. The method for automatically playing back context appropriate messages for an environment as described in claim 8 wherein said environment comprises a refrigerator environment, and wherein said step of accounting for dynamically changing circumstances comprises varying message playback to vary message content.

15. The method for automatically playing back context appropriate messages for an environment as described in claim 8 wherein said environment comprises a refrigerator environment, and wherein said step of accounting for dynamically changing circumstances comprises the step of playing said at least one user relevant environment themed behavior interactive message only if said timer countdown time period of said timer has expired.

16. The method for automatically playing back context appropriate messages for an environment as described in claim 1 further comprising the step of engaging in an ecommerce transaction.

17. The method for automatically playing back context appropriate messages for an environment as described in claim 1 further comprising the step of utilizing sponsored message content.

18. The method for automatically playing back context appropriate messages for an environment as described in claim 17 wherein said step of utilizing sponsored message content comprises the step of utilizing at least one advertising message.

19. The method for automatically playing back context appropriate messages for an environment as described in claim 1 further comprising the step of utilizing food relevant content messages.

20. The method for automatically playing back context appropriate messages for an environment as described in claim 1 further comprising the step of utilizing a smartphone connection.

21. The method for automatically playing back context appropriate messages for an environment as described in claim 1 wherein said step of commencing comprises a step selected from the group consisting of automatically commencing or user-controlled commencing.

* * * * *